Figure 1:
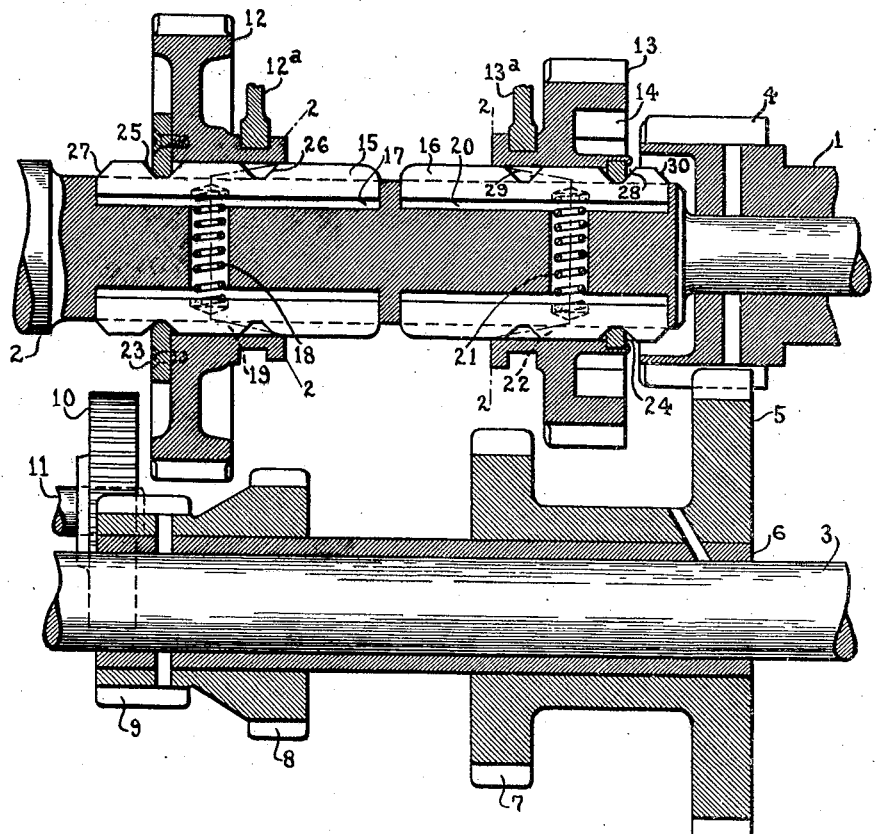

Apr. 3, 1923.

H. J. TAYLOR 1,450,266

VARIABLE SPEED GEAR SET

Filed Mar. 17, 1922

INVENTOR.
Herman J. Taylor
BY
ATTORNEY

Patented Apr. 3, 1923.

1,450,266

UNITED STATES PATENT OFFICE.

HERMAN J. TAYLOR, OF MILWAUKEE, WISCONSIN, ASSIGNOR TO THE CUTLER-HAMMER MFG. CO., OF MILWAUKEE, WISCONSIN, A CORPORATION OF WISCONSIN.

VARIABLE-SPEED GEAR SET.

Application filed March 17, 1922. Serial No. 544,436.

*To all whom it may concern:*

Be it known that I, HERMAN J. TAYLOR, a citizen of the United States, residing at Milwaukee, in the county of Milwaukee and State of Wisconsin, have invented new and useful Improvements in Variable - Speed Gear Sets, of which the following is a full, clear, concise, and exact description, reference being had to the accompanying drawing, forming a part of this specification.

This invention relates to variable speed gear sets for automobiles and other machines and more particularly to that type wherein speed changes are effected through the medium of sliding gears.

In such gear sets the sliding gears are usually permanently keyed to the driven shaft while the co-operating gears are permanently connected to the driving shaft and as is well known the momentum of the parts connected to such gears renders it exceedingly difficult to effect speed changes without considerable gear clashing.

The present invention has among its objects to provide an improved gear set of the sliding gear type wherein provision is made for disconnecting the sliding gears from the driven shaft during shifting thereof to minimize gear clashing.

Another object is to provide simple, rugged and efficient mechanism adapted to lock the sliding gears to the driven shaft in their neutral and operative positions and to release the same therefrom during shifting.

Another object is to provide simplified locking mechanism of the aforesaid character which can be readily applied to gear sets of the usual type without material redesign thereof.

Various other objects and advantages of the invention will hereinafter appear.

The accompanying drawing illustrates an embodiment of the invention which will now be described, it being understood that the invention may be employed in other types of gear sets without departing from the scope of the appended claims.

Figure 2:
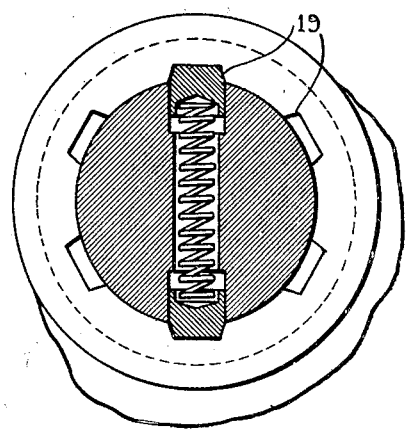

In the drawing,

Figure 1 is a vertical sectional view of a gear set embodying the invention; and Fig. 2 is a sectional view on line 2—2 of Fig. 1.

The gear set illustrated is of a type particularly adapted for automobiles and provides for three speeds in a forward direction and one speed in a reverse direction. More specifically there is shown a driving element 1 which is usually connected to the prime mover through the medium of a friction clutch, a driven shaft 2 and a fixed countershaft 3. Driving element 1 is provided with a pinion 4 on the end thereof, said pinion being in constant mesh with a spur gear 5 fixed to a bushing 6 rotatably mounted on countershaft 3. Bushing 6 also has spur gears 7, 8 and 9 fixed thereto, the latter being in constant mesh with a spur gear 10 rotatably mounted upon a fixed stud 11. Driven shaft 2 has mounted thereon spur gears 12 and 13, said gears being shown in neutral position and being shiftable in opposite directions therefrom by suitable selector means including shifter forks 12$^a$ and 13$^a$. Shifting of gear 12 towards the left meshes the same with gear 10 for reverse rotation of driven shaft 2, while shifting thereof towards the right meshes the same with gear 8 to drive said shaft at low speed. Shifting of gear 13 towards the left meshes the same with gear 7 to drive shaft 2 at an intermediate speed. Gear 13 is provided with internal gear teeth 14, and upon shifting of the same towards the right said teeth mesh with pinion 4 to drive shaft 2 at high speed.

Gears 12 and 13 are releasably locked against rotation with respect to driven shaft 2 by keys 15 and 16 respectively. Keys 15 are arranged in key seats 17 in opposite sides of shaft 2 and are biased outwardly by a spring 18 to engage keyways 19 in gear 12. Keys 16 are arranged in keyways 20 in opposite sides of shaft 2 and are biased outwardly by spring 21 to engage keyways 22 in gear 13. Keys 15 and 16 are depressible within shaft 2 against the action of their respective springs, the former keys being depressible by an annular cam plate 23 fixed to gear 12 and the latter being depressible by an annular cam plate 24 fixed to gear 13.

More specifically keys 15 are each provided with V-shaped recesses 25 and 26 in the outer face thereof and an inclined face 27 at the left hand end thereof while cam plate 23 is provided with a V-shaped surface on the interior thereof. With gear 12 in neutral position cam plate 23 is located in notches 25 to permit engagement of keys 15 with keyways 19 in gear 12. Upon initial movement of gear 12 in either direction out of neutral position cam plate 23 coacts with the sides of recesses 25 to depress keys 15 within shaft 2. Upon shifting of gear 12 into its extreme left hand position cam plate 25 rides over the inclined faces 27 and upon shifting thereof to its extreme right hand position said cam plate rides into notches 26. Keys 16 are each provided with V-shaped recesses 28 and 29 and an inclined face 30 at the right hand end thereof while cam plate 26 is provided with a V-shaped surface on the interior thereof. Recesses 28 are arranged to receive cam plate 26 when gear 13 is in neutral position and upon shifting of said gear in either direction out of such position said cam plate coacts with the sides of said recesses to depress keys 16 against the action of spring 21. Upon shifting of gear 13 into its extreme left hand position cam plate 24 rides into recesses 29 and upon shifting of gear 13 to its extreme right hand position said cam plate rides over the inclined faces 30.

Thus it is apparent that provision is made for releasing the shifted gears from driven shaft 2 during shifting movements thereof and since the momentum of each of said gears is relatively small it is apparent that gear shifting operations can be accomplished without considerable gear clashing. Further it should be noted that upon movement of either of the gears 12 and 13 into their operative positions their associated keys are released substantially instantaneously and are adapted to move into the keyways in said gears with a snap action under the action of their respective springs.

The shape of the keys and keyways may be varied as desired but as shown in Fig. 2 the sides of the keyways in the gears and the co-operating faces of the keys are tapered to facilitate movement of said keys into engagement with said keyways. It should also be noted that if desired separate keys can be employed for locking each of the gears in its different operative positions or if desired keys 15 and 16 can be made integral to obtain the aforedescribed results. Also if desired the keys can be so formed that the shiftable gears are released in their neutral positions and are locked only in their shifted positions.

What I claim as new and desire to secure by Letters Patent is:

1. In a power transmitting mechanism, the combination with co-operating gears, one being shiftable axially into and out of meshing relation with the other, a shaft for said shiftable gear and a member for releasably locking said shiftable gear against rotation with respect to said shaft, said member being operable by said shiftable gear to release the latter from said shaft during its movement into and out of mesh with the other of said gears.

2. In a power transmitting mechanism, the combination with co-operating gears, one being shiftable axially into and out of meshing relation with the other, a shaft for said former gear means for normally locking said former gear against rotation with respect to said shaft and means associated with said former gear for releasing said locking means during shifting of said former gear into and out of mesh with said latter gear.

3. In a power transmitting mechanism, the combination with an axially shiftable gear having neutral and operative positions, a shaft therefor, means for locking said gear against rotation with respect to said shaft when the same is in the aforesaid positions and for releasing said gear from said shaft during shifting thereof between said positions.

4. In a power transmitting mechanism, the combination, with an axially shiftable gear having neutral and operative positions, a shaft therefor, means for locking said gear against rotation with respect to said shaft when the same is in the aforesaid positions and for releasing said gear from said shaft during shifting thereof between said positions, said means also serving to releasably restrain said gear against shifting out of said positions.

5. In a power transmitting mechanism, the combination with an axially shiftable gear having neutral and operative positions, a shaft therefor, means for locking said gear against rotation with respect to said shaft when the same is in the aforesaid positions and means adapted during shifting of said gear on said shaft to release said means.

6. In a power transmitting mechanism, the combination with a shiftable gear having neutral and operative positions, a shaft therefor, a key for locking said gear to said shaft, said key being depressible within said shaft to permit rotation of said gear on said shaft and means associated with said gear for depressing said key during shifting of said gear between the aforesaid positions.

7. In a power transmitting mechanism in combination, a shiftable gear having neutral and operative positions, a shaft therefor, a key for locking said gear against rotation on said shaft, said key being biased to engage said gear and being depressed within said shaft for release of said gear and a part associated with said gear to engage said key, said part and said key having coacting faces for depressing said key during shifting of said gear between the aforesaid positions.

8. In a power transmitting mechanism, in combination, a shiftable gear having neutral and operative positions, a shaft therefor, a key for locking said gear against rotation on said shaft, said key being biased to engage said gear and being depressible in said shaft for release of said gear and a part associated with said gear to engage said key, said part and said key having co-acting faces whereby said key is depressed during shifting of said gear between the aforesaid positions and whereby said gear is releasably restrained in the aforesaid positions against shifting movements.

9. In a power transmitting mechanism, the combination, a plurality of shiftable gears, a shaft therefor, keys for locking said gears to said shaft, said keys being biased to engage said gears and being depressible within said shaft to release said gears to permit rotation thereof with respect to said shaft, a key actuating part associated with each of said gears, said part and said keys having co-operating faces whereby said keys are depressed within said shaft during shifting of any of said gears and are released upon completion of a shifting operation.

10. The combination with a shiftable gear having neutral and operative positions, a supporting shaft therefor, keys located on opposite sides of said shaft to lock said gear against rotation on said shaft, said keys being biased outwardly and being depressible to release said gear and a part associated with said gear for actuating said keys during shifting of said gear, said keys and said part having co-acting faces whereby said keys are released when said gear is moved into any of the aforesaid positions and are released during shifting thereof between said positions.

In witness whereof, I have hereunto subscribed my name.

HERMAN J. TAYLOR.